(12) United States Patent
Toulokhonova et al.

(10) Patent No.: US 7,323,531 B2
(45) Date of Patent: Jan. 29, 2008

(54) FLUORESCENT POLYSILOXANES

(75) Inventors: Irina S. Toulokhonova, Madison, WI (US); Robert C. West, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 38 days.

(21) Appl. No.: 10/982,065

(22) Filed: Nov. 5, 2004

(65) Prior Publication Data

US 2005/0100945 A1 May 12, 2005

Related U.S. Application Data

(60) Provisional application No. 60/518,457, filed on Nov. 7, 2003.

(51) Int. Cl.
*C08G 77/18* (2006.01)
(52) U.S. Cl. .......................... 528/43; 528/15; 528/29; 528/31
(58) Field of Classification Search ...................... None
See application file for complete search history.

(56) References Cited

U.S. PATENT DOCUMENTS 4,147,646 A * 4/1979 Cappo ........................ 361/327
6,337,383 B1 1/2002 West et al.

OTHER PUBLICATIONS

"Energy Transfer Studies with Fluorosiloxanes" authored by Pham-Van-Cang et al. and published in Eur Polym J. 1995, 31(3) 227-231.*
F. Dias et al., Anomalous Fluorescence of Linear . . . , 33 Macromolecules 4772-4779 (2000).
J. Bisberg et al., Excimer Emission and Wavelength . . . , 28 Macromolecules 386-389 (1995).
K. Belfield et al., Synthesis of Novel Polysiloxanes . . . , 31 Macromolecules 2918-2924 (1998).
B. Chauhan et al., A Catalytic Route to . . . , 20 Organometallics 2725-2729 (2001).
J. Burroughes et al., Light-Emitting Diodes Based On Conjugated Polymers, 347 Nature 539-541 (1990).
M. Bernius et al., Progress With Light-Emitting Polymers, 12 Advanced Materials 1737-1750 (2000).
S. Jenekhe et al., Excimers And Exciplexes of Conjugated Polymers, 265 Science 765-768 (1994).
J. Ohshita et al., Synthesis and Optical, Electrochemical, and Electron-Transporting Properties of Silicon-Bridged Bithiophenes, 18 Organometallics 1453-1459 (1999).
S. Yamaguchi et al., Silole-Containing Sigma- and Pi-conjugated Compounds, J. Chem. Soc. 3963-3702 (1998).
B. Tang et al., Efficient Blue Emission From Siloles, 11 J. Mater. Chem. 2974-2978 (2001).
H. Sohn et al., An Electroluminescent Polysilole and Some Dichlorooligosiloles, 121 J. Am. Chem. Soc. 2935-2936 (1999).
S. Yamaguchi et al., Silole-Thiophene Alternating Copolymers With Narrow Band Gaps, 39 Angew. Chem. Int. Ed. 1695-1697 (2000).
U. Pernisz et al., Photoluminescence of Phenyl-and Methyl-Substituted Cyclosiloxanes 729 ACS Symposium Series 114 (2000).
M. Hennecke et al., Fluorescence Properties Of Some Polysiloxanes With Pendant Carbazolyl Groups, 189 Makromol. Chem. 2601-2609 (1988).
L. Guizhi, Fluorescence Spectra Of Polysiloxane Grafted By Vinyl Carbazole And Ethyl Undecylenate, 15 Gaofenzi Cailiao Kexue Yu Goncheng 105 (1999) (abstract).

\* cited by examiner

*Primary Examiner*—Marc S. Zimmer
(74) *Attorney, Agent, or Firm*—Quarles & Brady LLP

(57) ABSTRACT

Disclosed herein are fluorescent polysiloxanes and methods of making them. Fluorescent aryl alcohols or fluorescent aryl carbinols are reacted with hydropolysiloxanes in the presence of a catalyst to link the fluorescent groups to the polysiloxane chain through an ether linkage. The resulting compounds are fluorescent and have other desirable properties.

6 Claims, No Drawings

FLUORESCENT POLYSILOXANES

CROSS-REFERENCE TO RELATED APPLICATIONS

This application claims priority based on U.S. provisional application 60/518,457 which was filed on Nov. 7, 2003.

STATEMENT REGARDING FEDERALLY SPONSORED RESEARCH/DEVELOPMENT

This invention was made with United States government support awarded by the following agency: NSF 9901266. The United States has certain rights in this invention.

BACKGROUND OF THE INVENTION

The present invention relates to polysiloxanes linked by ether linkages to fluorescent organic moieties. More particularly it relates to such polysiloxane compounds that are fluorescent.

Fluorescent polymers have been of interest for many years. See generally N. Barishnikov et al., *Fluorescent Polymers*, Horwood, London, UK (1994). Such fluorescent materials are of research interest, and are also of interest in connection with commercial applications (e.g. paints used on highway signage).

Such materials are now receiving even more attention because some fluorescent polymers are also electroluminescent, and so may be useful in polymeric light emitting diodes for advanced display technology. See generally J. Burroughes et al., 347 Nature 359 (1990); M. Bernius et al., 12 Advanced Materials 1737 (2000); S. Jenekhe et al., 265 Science 765 (1994); J. Oshita et al., 18 Organometallics 1453 (1999); S. Yamaguchi et al., J. Chem. Soc. 3963 (1998); B. Tang et al., 11 J. Mater. Chem. 2974 (2001); H. Sohn et al., 121 J. Am. Chem. Soc. 2325 (1999) and S. Yamaguchi et al., 39 Agnew. Chem., Inc. Ed., 1695 (2000).

In U.S. Pat. No. 6,337,383 our laboratory reported a number of techniques for synthesizing polysiloxane polymers, particularly those having multiple oligooxyethylene side chains per silicon. These materials were highly conductive, and thus of interest in connection with lithium batteries. Fluorescence or electroluminescence were not noted in connection with these compounds.

There have been some reports of fluorescent polysiloxanes. The fluorescence of poly(phenylmethylsiloxane) was studied in F. Dias et al., 33 Macromolecules 4772 (2000); the emission spectra of certain cyclic phenylsiloxanes have been investigated as described in M. Backet et al., 729 ACS Symposium Series 115 (2000); and polysiloxanes with pendant carbazolyl groups were observed to show fluorescence as described in M. Hennecke et al., 189 Makromol. Chem. 2601 (1988) and L. Guizhi 15 Gaofenzi Cailiao Kexue Yu Goncheng 105 (1999).

However, the fluorescence of many of such compounds was weak. In other cases, the wavelengths generated were not optimal for certain purposes. In still other cases the light wavelength needed to cause the fluorescence was not convenient for certain commercial purposes, and/or the material was expensive to create and/or had other less than optimal properties.

For example, certain fluorescent compounds have been grafted to polysiloxanes via alkene linkage reactions, resulting in compounds with electroluminescent properties. See generally J. Bisberg et al., 28 Macromolecules 386 (1995) and K. Belfield et al., 31 Macromolecules 2918 (1998).

While these materials have certain advantages, they are relatively difficult to synthesize, and in any event have certain wavelength limitations.

Also, in B. Chauhan et al., 20 Organometallics 2729 (2001), there was a report of grafting non-fluorescent aryl compounds to polysiloxanes using a rhodium catalyzed reaction of an aryl alcohol with poly(methylhydrosiloxane). The resulting compounds were of charge-transporting interest, but not reported as being fluorescent.

There is a continuing desire to develop other fluorescent polymers, particularly those that have well defined and intense light properties, where the material is relatively easy to produce, and where the material is in a form rendering it suitable for incorporation into commercial products.

SUMMARY OF THE INVENTION

In one aspect the present invention provides a fluorescent polysiloxane having the following moiety in it:

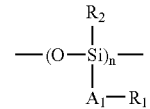

The n is selected from the group consisting of 1-500; the $R_1$ is selected from the group consisting of compounds which have the structure of a fluorescent organic alcohol albeit without a hydrogen that is present in an —OH group of the alcohol; and $A_1$ either indicates that $R_1$ is directly linked to the silicon through an oxygen present in $R_1$ or indicates that an alkyl group of less than four carbons links that silicon to an oxygen present in $R_1$.

$R_2$ is selected from the group consisting of alkyl groups of less than four carbons, $R_3$—O (wherein $R_3$ is an alkyl group of less than four carbons), and $A_1$-$R_1$. (wherein if $R_2$ is $A_1$-$R_1$, that $A_1$-$R_1$ need not necessarily be the same as the other $A_1$-$R_1$ linked to the same silicon).

In preferred forms, the compound is a multi-cyclic group with at least one aryl ring and having less than 50 carbons, such as one of the Compounds I-VI described below (with a hydrogen missing from the OH), or other multi-cyclic aryl alcohols or hetero-cyclic carbinols (with a hydrogen missing from the OH). Compounds I-VI will results in the fluorescent polysiloxane being poly[methyl(9-anthrylmethoxy)siloxane], poly[methyl(9-fluorenylmethoxy)siloxane], poly[methyl(1-naphthoxy)siloxane], poly[methyl(8-quinolinoxy)siloxane], poly[methyl(8-quinaldyloxy)siloxane] or poly[methyl(9-fluorenyloxy)siloxane], respectively.

Also, in such preferred forms the $R_2$ can be methyl and $A_1$ can indicate that $R_1$ is directly linked to the silicon through an oxygen present in $R_1$. Normally, n will be higher than 10 (e.g. 20-50), with the polysiloxane terminated by a conventional termination group (such as a Si—$Me_3$ group).

In another form the invention provides a method of forming such polysiloxanes. One reacts a polysiloxane that has in its main chain a silicon that is directly bonded to a hydrogen, with a fluorescent organic alcohol, in the presence of a catalyst, by dehydrogenative coupling.

The preferred catalysts are rhodium based (e.g. RhCl(PPh$_3$)$_3$), platinum based (e.g. Pt$^o$(Me$_2$ViSi)$_2$O or H$_2$PtCl$_6$), K$_2$CO$_3$, or Et$_3$N. Triethylamine and the platinum catalysts are very active, allowing the reaction to proceed at even room temperature. However, they also yielded a small amount of insoluble, apparently crosslinked, material as an undesired by-product.

With potassium carbonate the dehydrocoupling also takes place very rapidly, but is accompanied by extensive crosslinking. Hence, this would not be a preferred catalyst absent very low temperature process conditions.

The most pure final products were obtained using RhCl(PPh$_3$)$_3$, although the coupling using this catalyst was slower and required higher reaction temperature. Generally, aryl alcohols reacted somewhat more quickly than aryl carbinols.

The resulting compounds were strongly fluorescent, and could be used in a solvent such as benzene, as a paint. Such compounds were also useful as additives to other paint formulations for applications such as marking and information communication.

The total silicons in the main polysiloxane chain are preferably between 2 and 500, most preferably between 8 and 60. While each silicon within the main polysiloxane chain could be linked to the fluorescent side chain moiety, it is merely required that one such linkage be present.

Further, while a single silicon can have one such fluorescent group, it also could be substituted twice (e.g. if instead of a methyl group one starts with silicon in the main backbone having two hydrogens). Thus, while the examples shown are indicative of one application of the present invention, a variety of other forms are also possible.

The above and still other advantages of the present invention will be apparent from the description which follows. The following description is merely of the preferred embodiments. The claims should therefore be looked to in order to understand the full scope of the invention.

DESCRIPTION OF THE PREFERRED EMBODIMENTS

Overview

We describe below the creation of polysiloxane polymers having internal silicons (preferably all internal silicons) in the main chain linked to fluorescent moieties that facilitate the compounds fluorescing in response to light, preferably in response to visible or UV light. The experiments that follow can be understood in summary fashion with reference to the following schematic illustration:

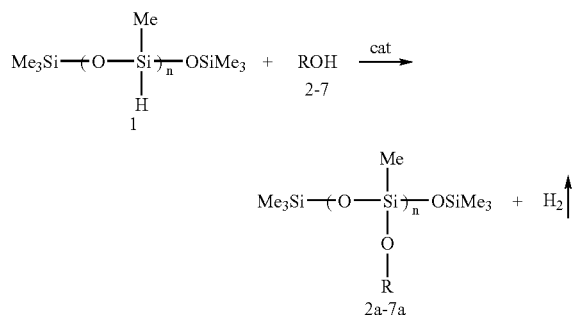

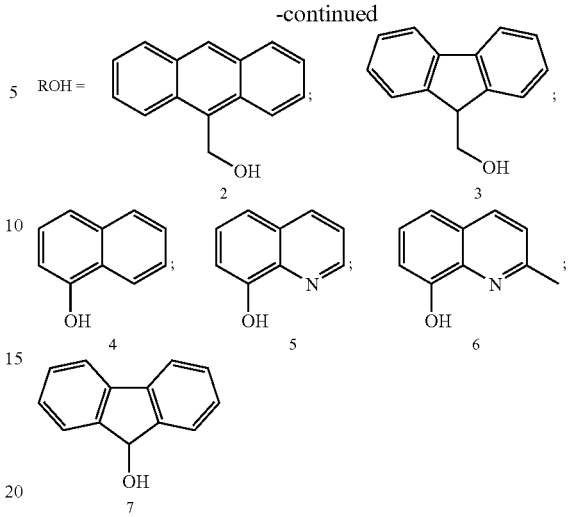

All reactions were carried out using a standard Schlenk line under a nitrogen or argon gas atmosphere. This was done to avoid the possibility of water interfering with the reaction.

All solvents were dried and distilled from sodium/benzophenone solutions. Poly(methylhydrosiloxane), (PMHS), (Mw~2000; n=33-35) and RhCl(PPh$_3$)$_3$ (99.99%) were obtained from Aldrich and used as received. Commercially available fluorescent alcohols 2-7 (Compound 2, Compound 3, Compound 4, Compound 5, Compound 6 and Compound 7, respectively) were used without further purification.

All polymers 2a-7a were analyzed by $^1$H, $^{13}$C and $^{29}$Si NMR, UV-VIS, fluorescent and FT-IR spectroscopy. Infrared spectra were recorded on a Mattson Polaris FT-IR spectrometer (film on KBr disk). $^1$H, $^{13}$C NMR and $^{29}$Si NMR spectra were determined in CDCl$_3$ at 20° C. on a Varian INOVA—500 spectrometer working at 500.0 MHz for $^1$H and 99.38 MHz for $^{29}$Si. The chemical shifts were measured in ppm using TMS as an internal standard ($^1$H, $^{29}$Si data).

Electronic absorption and fluorescence spectra were recorded on a HP 8452 UV-visible spectrophotometer and F-4500 fluorescence spectrophotometer, respectively. The quantum yields for resulting compounds 2a-7a were measured in cyclohexane solution. Anthracene, naphthalene and quinine sulfate in 0.1N sulfuric acid were used as standards. See N. Demas et al., 75 J. Phys. Chem. 991 (1971).

EXAMPLE 1

Synthesis Of Compound 2a

Poly(methylhydrosiloxane)("PMHS") (0.12 mL, 2 mmol), RhCl(PPh$_3$)$_3$ (0.18 mg, 0.02 mmol) and anthracenemethanol (Compound 2) (0.42 g, 2 mmol) were placed in a Schlenk flask and air was removed by pumping during 0.5 h at room temperature. The flask was flashed with argon, dry benzene (0.8 mL) was added, and this mixture was heated at 78° C. for 24 h. After the reaction was complete, the mixture was passed through a silica gel pad with CHCl$_3$: benzene (1:10) eluent. Solvent was removed under vacuum and polymer 2a was obtained in 90% yield.

EXAMPLES 2-6

Synthesis of Polymers 3a-7a

Polymers 3a-7a were obtained by using similar techniques and molar ratios, albeit with Compound 2 replaced with Compounds 2-7.

Results

No evidence of Si—H bond presence was observed in FT-IR spectra of the resulting polymers 2a-7a. This confirmed that the hydrogen had been substituted for. Further supporting data for the compounds is as follows:

(a) Compound 2a—poly[methyl(9-anthrylmethoxy)siloxane]. $^1$H NMR (CDCl$_3$): δ 0.06 (s, broad, OSiMe$_3$); 0.13 (s, broad, SiMe); 5.53 (s, broad, OCH$_2$); 7.28-8.31 (broad, aromatics). $^{29}$Si NMR (CDCl$_3$): −57.41 (SiMe); +10.32 (terminal OSiMe$_3$). GPC (toluene/polystyrene): M$_w$=17190 (M$_w$/M$_n$=1.15).

(b) Compound 3a—poly[methyl(9-fluorenylmethoxy)siloxane]. $^1$H NMR (CDCl$_3$): δ 0.06 (s, OSiMe$_3$); 0.31-0.54 (s, broad, SiMe); 5.66 (s, broad, OCH$_2$); 7.28-8.74 (broad, aromatics). $^{29}$Si NMR (CDCl$_3$): −56.35, −57.51 (SiMe); +9.71 (terminal OSiMe$_3$). GPC (toluene/polystyrene): M$_w$=9652 (M$_w$/M$_n$=1.03).

(c) Compound 4a—poly[methyl(1-naphthoxy)siloxane]. $^1$H NMR (CDCl$_3$): δ 0.15 (s, OSiMe$_3$); 0.30 (s, broad, SiMe); 7.14-8.29 (broad, aromatics). $^{29}$Si NMR (CDCl$_3$): −60.70, −61.29 (SiMe); +11.01 (terminal OSiMe$_3$). GPC (toluene/polystyrene): M$_w$=10650 (M$_w$/M$_n$=1.06).

(d) Compound 5a—poly[methyl(8-quinolinoxy)siloxane]. $^1$H NMR (CDCl$_3$): δ 0.13 (s, OSiMe$_3$); 0.30 (s, broad, SiMe); 7.14-7.32 (broad, aromatics). $^{29}$Si NMR (CDCl$_3$): −62.70, −62.96 (SiMe); +8.50 (terminal OSiMe$_3$). GPC (toluene/polystyrene): M$_w$=11130 (M$_w$/M$_n$=1.31).

(e) Compound 6a—poly[methyl(8-quinaldyloxy)siloxane]. $^1$H NMR (CDCl$_3$): δ 0.03 (s, OSiMe$_3$); 0.13-0.49 (s, broad, SiMe); 2.61-2.66 (s, broad, CH$_3$); 7.14-8.48 (broad, aromatics). $^{29}$Si NMR (CDCl$_3$): −61.98, −63.18, −63.76 (SiMe); +8.68 (terminal OSiMe$_3$). GPC (toluene/polystyrene): M$_w$=9875 (M$_w$/M$_n$=1.22).

(f) Compound 7a—poly[methyl(9-fluorenyloxy)siloxane]. $^1$H NMR (CDCl$_3$): δ 0.13 (s, OSiMe$_3$); 0.30 (s, broad, SiMe); 7.14-7.32 (broad, aromatics). $^{29}$Si NMR (CDCl$_3$): −56.77, −57.87, −58.09 (SiMe); +9.80 (terminal OSiMe$_3$). GPC (toluene/polystyrene): M$_w$=14530 (M$_w$/M$_n$=1.1).

Alternative Catalysts

We also tested the effect of alternative catalysts in similar reactions. In this regard, triethylamine, H$_2$PtCl$_6$, Karlstedt's catalyst ("Pt°") and K$_2$CO$_3$ were used as catalysts. These catalysts (and the rhodium based ones) are believed to work either by facilitating the splitting of the silicon hydrogen bond, or by facilitating the removal of the hydrogen from the alcohol oxygen.

A catalyst (0.5% of H$_2$PtCl$_6$ (or Karlstedt's catalyst ("Pt°"), or K$_2$CO$_3$, or 20% of triethylamine) was placed in a Schlenk flask and degassed by freeze-pump cycle three times. A solution of an air free mixture of PMHS (2 mmol) with an alcohol (2 mmol) in dry benzene (1 mL) was transferred into the flask with the degassed catalyst.

A vigorous evolution of hydrogen was observed at room temperature. For most catalysts the reaction was complete after 3-4 hours at room temperature. The completion of the reaction was monitored by $^1$H NMR spectroscopy. After removing solvent the polymer was analyzed by $^{29}$Si NMR and unidentified signals in the −40 to −50 ppm region were observed, in addition to the signals of polymers 2a-7a. It appears that new signals at −40 to −50 ppm are due to undesired crosslinked products.

Fluorescence

We then tested the fluorescence of several of these compounds in varied solvents, under UV and/or visible light excitation:

(a) For each of compound 2a, 3a, 4a, 5a and 6a in methylene chloride solution we observed long wavelength fluorescence attributable to excimers in the emission spectra.

(b) For both compounds 6a and 7a in methylene chloride solution, we also observed fluorescence, but less long wavelength fluorescence.

The emission spectra of our polymers also show some solvent dependence. For example, with respect to compound 3a, the fluorescence is weakest in cyclohexane, slightly stronger in THF, and strongest in methylene chloride. Increasing intensity of the long wavelength band is likely with solvent polarity, as a general rule.

Intensity and structure of the emission depends on the excitation wavelength applied. For example, where compound 3a is excited at 268 nm in methylene chloride, the results were dramatically different than when excited at 316 nm. Similar results were achieved by shifting the excitation wavelength in tetrahydrofuran.

While a number of embodiments of the present invention have been described above, the present invention is not to be considered limited to the specific examples described above. In this regard, there are other modifications that are meant to be within the scope of the invention. For example, in the starting compound it is not critical that the silicons within the main chain that have the hydrogens also have an alkyl group, or that the alkyl group if present be methyl. Further, the terminal units of the chains can be varied, as is well known for polysiloxanes. Thus, the claims should be looked to in order to judge the full scope of the invention.

INDUSTRIAL APPLICABILITY

The present invention provides compounds useful for various fluorescent purposes, and methods of making them. Such compounds may also have electroluminescence.

What is claimed is:

1. A fluorescent polysiloxane having the following moiety in it:

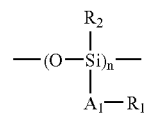

wherein n is selected from the group consisting of 1-500;

wherein R$_1$ is selected from the group consisting of compounds which have the structure of a fluorescent organic alcohol albeit without a hydrogen that is present in an —OH group of the alcohol;

wherein A$_1$ indicates that R$_1$ is directly linked to the silicon through an oxygen present in R$_1$;

wherein R$_2$ is selected from the group consisting of alkyl groups of less than four carbons, R$_3$—O (wherein R$_3$ is an alkyl group of less than four carbons), and A$_1$-R$_1$ (wherein if $R_2$ is $A_1$-$R_1$, this $A_1$-$R_1$ need not necessarily be the same as the other $A_1$-$R_1$ linked to the same silicon); and wherein the alcohol that the polysiloxane was formed from is selected from the group consisting of the following compounds:

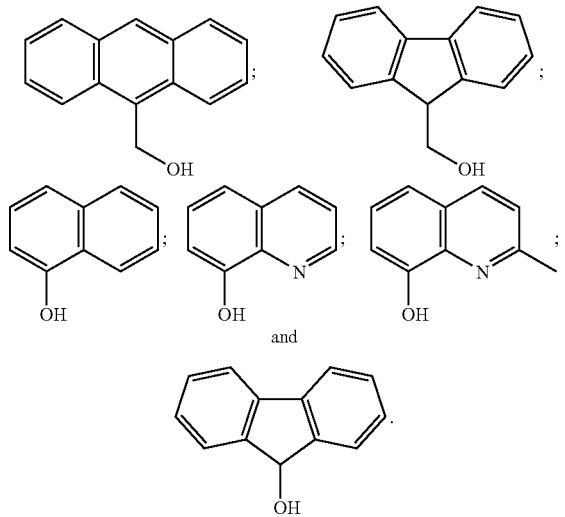
and

2. A fluorescent polysiloxane having the following moiety in it:

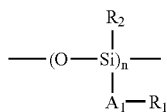

wherein n is selected from the group consisting of 1-500;

wherein $R_1$ is selected from the group consisting of compounds which have the structure of a fluorescent organic alcohol albeit without a hydrogen that is present in an —OH group of the alcohol;

wherein $A_1$ either indicates that $R_1$ is directly linked to the silicon through an oxygen present in $R_1$ or indicates that an alkyl group of less than four carbons links that silicon to an oxygen present in $R_1$;

wherein $R_2$ is selected from the group consisting of alkyl groups of less than four carbons, $R_3$—O (wherein $R_3$ is an alkyl group of less than four carbons), and $A_1$-$R_1$ (wherein if $R_2$ is $A_1$-$R_1$, this $A_1$-$R_1$ need not necessarily be the same as the other $A_1$-$R_1$ linked to the same silicon); and wherein the fluorescent polysiloxane is selected from the group consisting of poly[methyl (9-anthrylmethoxy)siloxane], poly[methyl (9-fluorenylmethoxy)siloxane], poly[methyl (1-naphthoxy)siloxane], poly[methyl (8-quinolinoxy)siloxane], poly[methyl (8-quinaldyloxy)siloxane] and poly[methyl (9-fluorenyloxy)siloxane].

3. A method of forming a polysiloxane of claim 1, the method comprising:

reacting a polysiloxane that has in its main chain a silicon that is directly bonded to a hydrogen, with a fluorescent organic alcohol, in the presence of a catalyst, by dehydrogenative coupling;

whereby the fluorescent polysiloxane is formed.

4. The method of claim 3, wherein the reaction is conducted at between 0° C. and 100° C.

5. The method of claim 4, wherein the reaction is conducted at a temperature between 20° C. and 90° C.

6. The method of claim 3, wherein the reaction is conducted in the presence of a catalyst comprising rhodium or platinum.

* * * * *